(12) United States Patent
Liao

(10) Patent No.: US 8,776,592 B2
(45) Date of Patent: Jul. 15, 2014

(54) AUTOMATIC HYDROLOGIC PARAMETER MEASURING SYSTEM FOR RIVER FLOW AND THE METHOD USING THE SAME

(76) Inventor: Yi-Jiun Liao, Taipei Hsien (TW)

(\*) Notice: Subject to any disclaimer, the term of this patent is extended or adjusted under 35 U.S.C. 154(b) by 76 days.

(21) Appl. No.: 13/523,907

(22) Filed: Jun. 15, 2012

(65) Prior Publication Data

US 2013/0333463 A1  Dec. 19, 2013

(51) Int. Cl.
*G01N 1/00* (2006.01)

(52) U.S. Cl.
USPC .................... 73/170.29; 73/170.32

(58) Field of Classification Search
USPC .......................... 73/170.29–170.34
See application file for complete search history.

(56) References Cited

U.S. PATENT DOCUMENTS

| | | | | |
|---|---|---|---|---|
| 3,590,635 A * | 7/1971 | Duing | | 73/170.29 |
| 5,570,303 A * | 10/1996 | Dessureault | | 702/3 |
| 6,332,360 B1 * | 12/2001 | Su | | 73/597 |
| 6,463,801 B1 * | 10/2002 | Young et al. | | 73/170.32 |
| 2010/0005857 A1 * | 1/2010 | Zhang et al. | | 73/29.02 |

\* cited by examiner

*Primary Examiner* — Andre Allen

(57) ABSTRACT

An automatic hydrologic parameter measuring system for a river flow comprises a supporting installed below a bridge surface; a waterproof box connected to a steel rope for suspending a weight; another end of the rope extending downwards out of the waterproof box for retaining the weight; a waterproof electric wire winding around the steel rope for transferring signals to the signal processor; a water pressure meter installed in a hollow space of the weight; when the weight being in water, the water pressure meter starts the measuring process; after the weight reaches to the riverbed, the water pressure is unchangeable; and a water pressure meter installed in a hollow space of the weight; when the weight being in water, the water pressure meter starts the measuring process; after the weight reaches to the riverbed, the water pressure is unchangeable.

13 Claims, 3 Drawing Sheets

AUTOMATIC HYDROLOGIC PARAMETER MEASURING SYSTEM FOR RIVER FLOW AND THE METHOD USING THE SAME

FIELD OF THE INVENTION

The present invention related to hydrologic parameter measuring for river flows, and in particular to an automatic hydrologic parameter measuring system for a river flow and the method using the same.

BACKGROUND OF THE INVENTION

For a river, measurements of hydrologic parameters are helpful to early warning of floods, safety of persons and bridges, etc. The parameters are such as water levels, flow speeds, riverbeds, sand density in the flows, etc. However, currently, other than water levels, other hydrologic parameters are measured manually. For example, in measurement of the height from the riverbed to the surface of a river, conventionally, a weight is tied to a rope and then they sunk into water and then to the riverbed. The length from the river surface to the riverbed can be derived by the height of the bridge to the river surface subtracting the length of the rope. However, the rope is easy to vibrate and thus is not vertical to the river surface. Especially, as great wind blows, due to wind force or water flow, the rope is bent greatly to affect the measurement results.

Practically, in typhoon period, flood flow is strong, under the consideration of personal safety or when the bridge is closed, manual monitor cannot be realized all day long so that it is very possible that no data is monitored when the flow is at a peak value. As a result, the system can not provide an effective assistance.

Although some manual operations are planned to be preformed, the time period is too long to get affect data. Furthermore, at night or heavy rain period, the personal safety and precision of the result are greatly affected. Therefore, there is an eager demand for a novel automatic monitoring system which can provide effect monitor results to replace the conventional manual operations.

SUMMARY OF THE INVENTION

Accordingly, for improving the above mentioned prior art defects, the present invention provides an automatic hydrologic parameter measuring system for a river flow comprises a supporting installed below a bridge surface; a waterproof box connected to a steel rope for suspending a weight; another end of the rope extending downwards out of the waterproof box for retaining the weight; a waterproof electric wire winding around the steel rope for transferring signals to the signal processor; a water pressure meter installed in a hollow space of the weight; when the weight being in water, the water pressure meter starts the measuring process; after the weight reaches to the riverbed, the water pressure is unchangeable; and a water pressure meter installed in a hollow space of the weight; when the weight being in water, the water pressure meter starts the measuring process; after the weight reaches to the riverbed, the water pressure is unchangeable.

DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
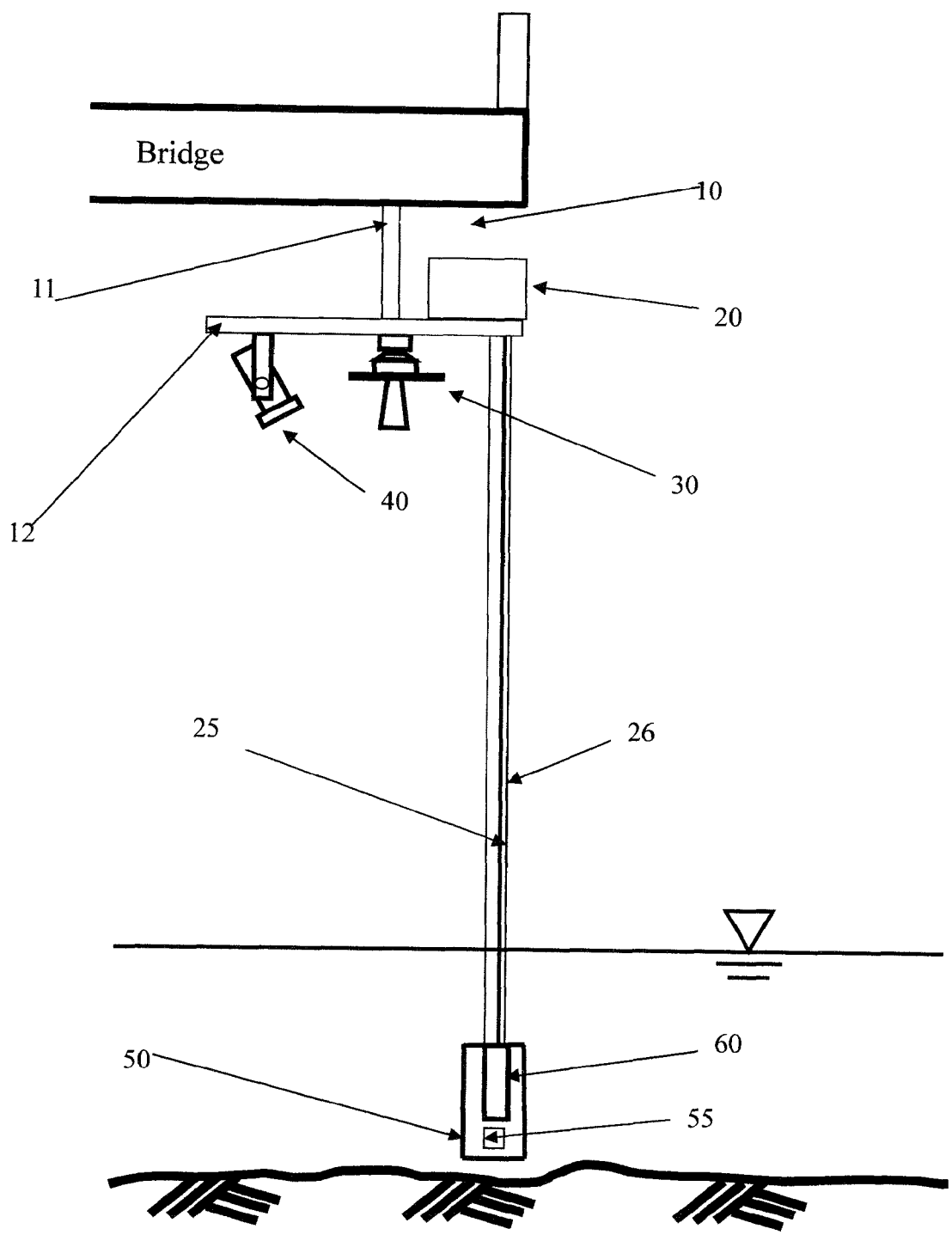
FIG. 1 shows the elements of the present invention.
Figure 2:
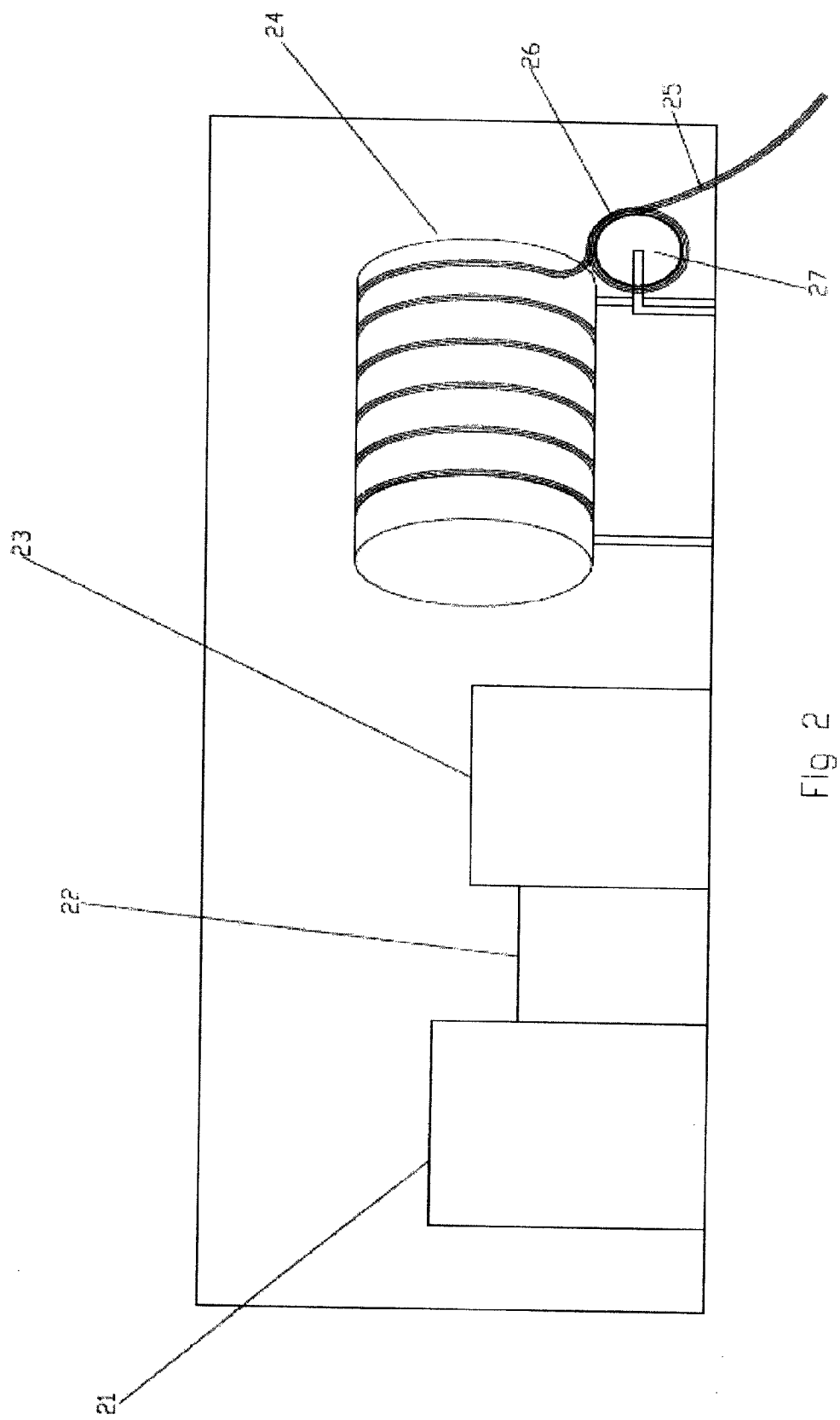
FIG. 2 is the details of the waterproof box of the present invention.

The present invention relates to a device for automatically measuring flow parameters of a river and the system of the same. The present invention includes the following elements with reference to FIGS. 1, 2 and 3.

A supporting frame 10 serves for fixing all measurement units of the present invention. In using, the supporting frame 10 is installed below a bridge surface or a rope running across a river. The supporting frame 10 includes a stand plate 11 connected to a bottom side of a bridge surface. A plate 12 is connected to the stand plate 11. An iron waterproof box 20 is installed on the plate 12. A level meter 30 and the flow meter 40 are installed at a bottom side of the plate 12.

The waterproof box 20 is installed on the plate 12. The box 20 is installed thereinside with a signal processor 21, a data storage device 22, a communication device 23, a wire winding unit 24, a steel rope 24, waterproof electric wires 26 for signal transmission, and a pulley 27. The signal processor 21 and the data storage device 22 may be realized as a computer. The wire winding unit 24 is connected to the steel rope 25. The steel rope 25 extends out of the waterproof box 20 for suspending a heavy weight 50 and a supersonic sand density meter 60. The heavy weight 50 is a hollow round cylinder One end of the steel rope 25 is connected to the wire winding unit 24 and another end thereof extends downwards out of the waterproof box 20 for retaining the weight 50. The waterproof electric wire 26 winds around the steel rope 25 for transferring signals from the sand density meter 60 and water pressure meter 55 to the signal processor 21. Since the steel rope 25 is descendable, it can measure the sand densities in different water levels.

The signal processor 21 can emit signals in a predetermined period to the level meter 30 and the surface flow meter 40 to measure the water level and flow speeds. The signal processor 21 emits signals to the wire winding unit 24 for releasing the steel rope 25, the waterproof electric wire 26, the weight 50, the water pressure meter 55 and the sand density meter 60. The signal processor 21 has the function of setting time period for measuring the hydrologic parameters and data can be stored in the data storage device 22. Computer control is used to have higher precision than manual operations and without interference from whether variations. Furthermore, the bridge structure will not affect the measurement results at night.

The communication device 23 is a wired or wireless communication device for data communication to far end devices so that users can analysis and process the data at far ends. Persons need not be aside the measuring device of the present invention. The users can control the device of the present invention through mobile devices such as handsets or tablet computers.

The level meter 30 (i.e., a water level gauge) 30 is installed below the plate 12 of the supporting frame 10. The level meter 30 is a supersonic wave level meter or an RF level meter 30 which measures water levels by reflecting supersonic wave or by reflected RF waves from the surface of river water.

The flow speed meter 40 measures flow speed on a river surface. The flow speed meter 40 is an RF flow speed meter 40 which measures speeds by reflecting RF waves or an image tracking flow speed meter which measures speeds by image comparisons.

The weight 50 is installed at a distal end of the steel rope 25 for sinking the water pressure meter 55 and the sand density meter 60 to the riverbed. The water pressure meter 55 is placed into the hollow space of the weight 50. When the weight 50 is in water, the water pressure meter 55 starts the measuring process. After the weight 50 reaches to the riverbed, the water pressure is unchangeable. Thus, whether the water pressure reaches to a fixed value is used to determine whether the weight 50 reaches to the riverbed.

The sand density meter 60 is installed at the distal end of the steel rope 25 and above the weight 50. It is a supersonic sand density meter 60. Furthermore, if necessary, a resistance-form flow speed meter can be used therewith.

A tail 51 is connected to the weight 50 for retaining the weight 50 to a fixed direction without rotation. Thus the measured flow speed is a précised one.

In the present invention, the weight 50 can be added with a resistant heat dissipated flow speed meter. With the data of the water pressure meter 55, the speed distribution along different depth of the water flow can be derived. Therefore, the average flow speed, flow volume and sand transfer volume can be calculated precisely.

Figure 3:
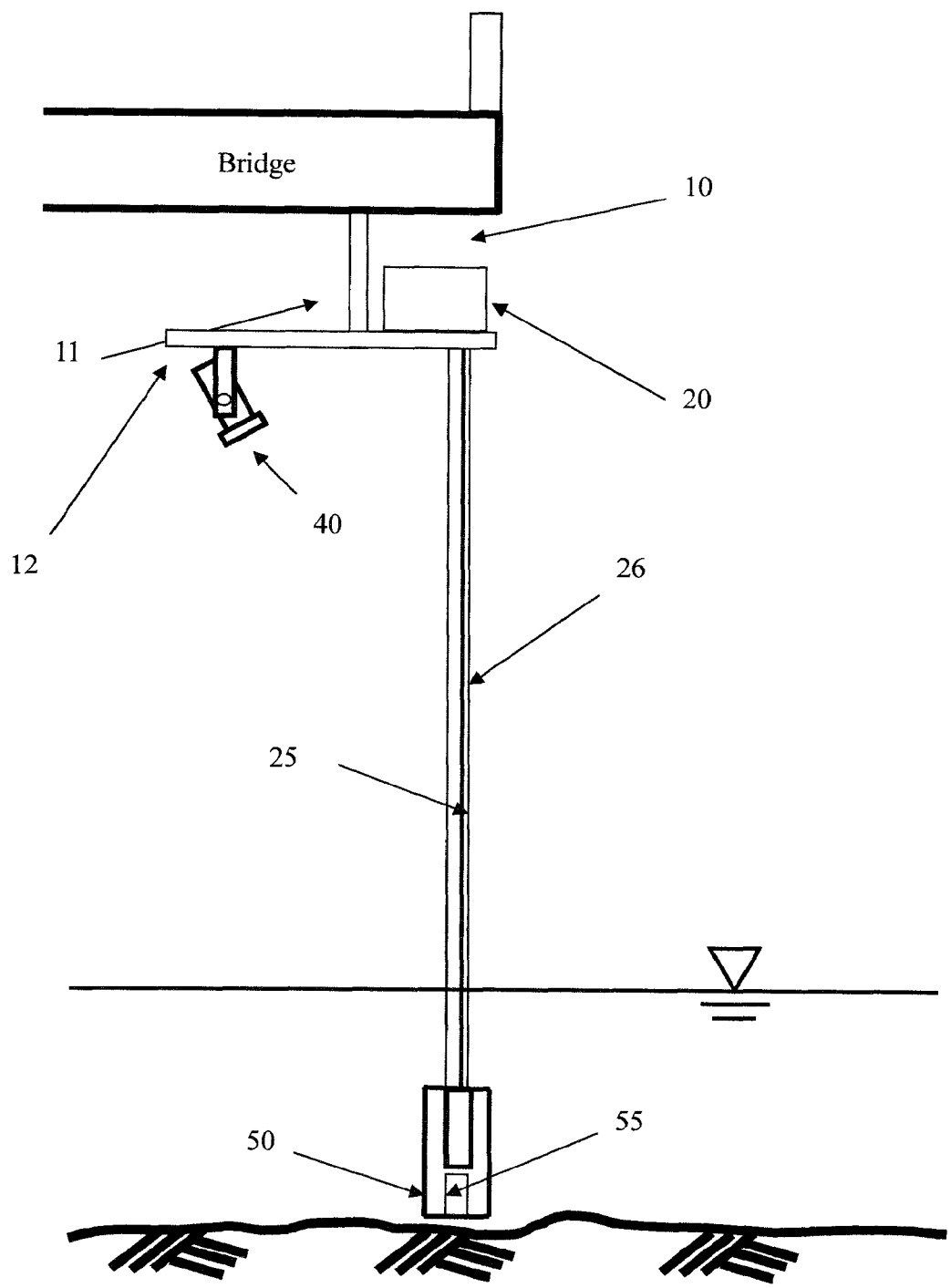
FIG. 3 is a schematic view a simplified design of the present invention.

The elements of the present invention can be modularized. Other than the elements for calculating the hydrologic parameters and the logics used in the present invention, some elements can be removed. For example, if the bridge has installed with a level meter 30, then no level meter 30 is necessary in the structure of the present invention. The sand density meter 60 can be reused as shown in FIG. 3.

In the present invention, computer systems are used to measure hydrologic data. The signal processor 21 will instruct the wire winding device to released the steel rope 25, the waterproof electric wire 26, the sand density meter 60, the water pressure meter 55 and the weight 50 so that the level meter 30 and the flow speed meter 40 are used to measure the water level and the flow speed on a surface of a flow. When the weight 50 sinks into water, the water pressure meter 55 will measure water pressures to get water depth data. When the weight 50 reaches to the riverbed, the water pressure is unchanged so as to determine whether the weight 50 has reached to the riverbed. The fixed water pressure serves to determine the water depth (from the surface of the river to the riverbed).

An unchanged water pressure serves to determine the water depth from the river surface to the riverbed. The thickness of deposited sands in different times can be calculated from the water depths in different times from the calculation of water pressures. The sand density meter 60 can be used with the water pressure meter 55 so as to have the sand densities in different elevations of the water.

Advantages of the present invention are that: the hydrologic data can be automatically measured in a set time period. No operator is necessary. The precision of measurement is higher than manual operated data. The results are not affected by whether even at night or the bridge is closed. The measured results are automatically reported real time without manual operations. Far end control is permissible through handset, tablet computers, etc. The height of the riverbed can be derived so that the flow volume is calculated from the flow speeds of different cross sections of the river flow. The sand depths in different levels can be derived real time, while in the prior art, the operators take samples to laboratory for analysis and then have the value. Furthermore, the prior art method only has the sand densities of former 20% of whole water depth under the river surface, but the present invention has greatly improved the defects in the prior art. If a resistance-form flow speed meter is used with the water pressure meter, the flow speed distribution along a vertical cross sectional view can be derived so that précised average flow speed, flow volume, sand transfer quantity, etc. can be got. In the present invention, the length of the steel rope is not used to calculate the height of the water level so that even the steel rope is bent by wind or water flow, the calculating result is not affected. This is an apparent difference between the present invention and the prior art.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automatic hydrologic parameter measuring system for a river flow, comprising:
   a supporting frame for fixing measurement units; in using, the a supporting frame being installed below a bridge surface or a rope running across a river;
   a waterproof box installed on the supporting frame;
   a wire winding unit connected to a steel rope; the steel rope extending out of the waterproof box for suspending a weight;
   one end of the steel rope connected to the wire winding unit and another end thereof extending downwards out of the waterproof box for retaining the weight; the waterproof electric wire winding around the steel rope for transferring signals to the signal processor;
   the signal processor emitting signals to the steel rope, the waterproof electric wire and the weight, the signal processor having a function of setting time period for measuring hydrologic parameters; and
   a water pressure meter installed in a hollow space of the weight at a distal end of the steel rope; when the weight being in water, the water pressure meter starts the measuring process; after the weight reaches to the riverbed, the water pressure is unchangeable; thus, whether the water pressure reaches to a fixed value is used to determine whether the weight reaches to the riverbed.

2. The automatic hydrologic parameter measuring system for a river flow as claimed in claim 1, further comprising:
   a sand density meter installed at a distal end of the steel rope.

3. The automatic hydrologic parameter measuring system for a river flow as claimed in claim 2, wherein the sand density meter is a supersonic sand density meter.

4. The automatic hydrologic parameter measuring system for a river flow as claimed in claim 1, further comprising:
   a flow speed which is used with the water pressure meter, the flow speed distribution along a vertical cross section of a flow can be derived so that precised average flow speed, average flow volume, average sand transfer quantity are got.

5. The automatic hydrologic parameter measuring system for a river flow as claimed in claim 1, further comprising:
   a flow speed meter measuring flow speed on a river surface; the flow speed meter being an RF flow speed meter which measures speeds by reflecting RF waves or an image tracking flow speed meter which measures speeds by image comparisons.

6. The automatic hydrologic parameter measuring system for a river flow as claimed in claim 1, further comprising:
a level meter installed at a lower side of the supporting frame.

7. The automatic hydrologic parameter measuring system for a river flow as claimed in claim 6, wherein the level meter measures water levels by reflecting supersonic wave or by reflected RF waves from the surface of river water.

8. The automatic hydrologic parameter measuring system for a river flow as claimed in claim 1, further comprising:
a communication device being a wired or wireless communication device for data communication to far end devices so that users can analysis and process the data at far ends.

9. The automatic hydrologic parameter measuring system for a river flow as claimed in claim 1, further comprising:
a tail connected to the weight for retaining the weight to a fixed direction without rotation.

10. An automatic hydrologic parameter measuring method, comprising the steps of:
a signal processor on a bridge instructing a wire winding device to releasing a steel rope, and a waterproof electric wire winding around the steel rope; and a level meter and a water pressure meter are actuated;
when a weight at a distal end of the steel rope sinks into water, a water pressure meter attached to the weight will measure water pressures to get water depth data; wherein when the weight reaches to the riverbed, the water pressure is unchanged.

11. The method as claimed in claim 10, wherein a thickness of deposited sands in different times is calculated from the water depths in different times from the calculation of water pressures.

12. The method as claimed in claim 10, wherein
the level meter serving to measure a height from the level meter to a surface of a river water; and
the water pressure meter serving to measure a height from a surface of a river water to a riverbed.

13. The method as claimed in claim 10, wherein a thickness of deposited sands in different times is calculated from the water depths in different times from the calculation of water pressures.

* * * * *